March 10, 1942.   E. R. PERRY   2,275,989
PROCESS FOR PRODUCING A RESINOUS PRODUCT Filed Sept. 14, 1938

WITNESSES:

INVENTOR
Eugene R. Perry.
BY
ATTORNEY

Patented Mar. 10, 1942

2,275,989

UNITED STATES PATENT OFFICE 2,275,989

PROCESS FOR PRODUCING RESINOUS PRODUCTS

Eugene R. Perry, Forest Hills, Pa., assignor to Westinghouse Electric & Manufacturing Company, East Pittsburgh, Pa., a corporation of Pennsylvania Application September 14, 1938, Serial No. 229,905

4 Claims. (Cl. 154—2)

This invention relates to a resinous product and particularly to the process of producing the same.

Composite articles such as plates formed from sheets of fibrous material impregnated with a synthetic resin and consolidated under heat and pressure into a compact integral unit have been employed heretofore as the backing sheet in wood or metal veneering and as the veneering facing sheet. The application of such composite articles in veneering, however, has heretofore been quite difficult, since the composite plate is given a smooth glazed surface during the molding process.

Because of the smooth glaze on the molded article it was necessary to grind or sand the surface glaze to give a rough surface for receiving the veneering bond with the result that the resistance of the plate to moisture was greatly reduced. If the surface glaze was not removed in this manner a cementitious binder had to be employed which would bond with the glazed surface. Such cements are few and costly, and are of necessity flexible and are generally not resistant to elevated temperatures.

Attempts have also been made to provide a backing sheet on the molded article by molding porous sheets such as paper, fish paper, etc., which are slightly impregnated or coated to have a low resin content to the impregnated sheets. Such practice produced unbalanced plates which warped and when, after a short period of aging, were found to be unsuitable for employment in veneering.

An object of this invention is the provision of a process for making a composite article having a surface suitable for cooperating with a cementitious material that may be utilized for mounting the article.

A further object of this invention is the provision of a process for making a composite article suitable for veneering and having a rough surface molded as an integral part of the article.

Another object of this invention is the provision of a process for making composite articles suitable for veneering purposes.

Figure 1:
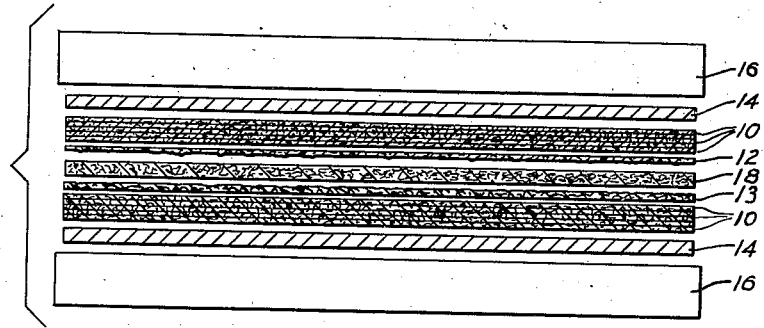
Figure 2:
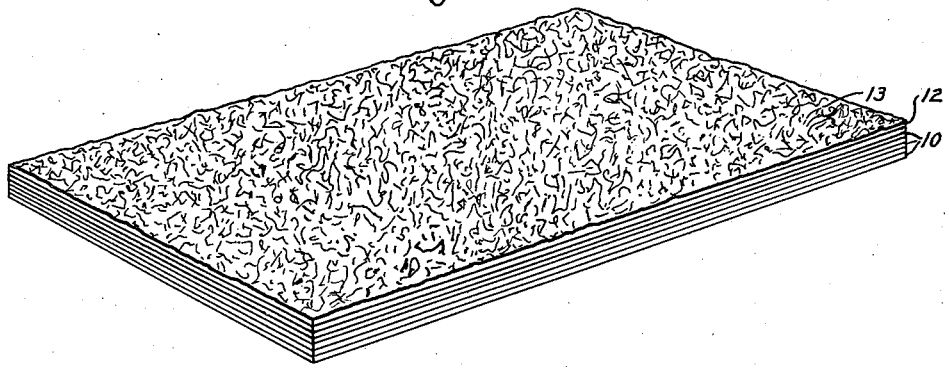

Other objects of this invention will become apparent from the following description when taken in conjunction with the accompanying drawing in which:

Figure 1 is an exploded elevation view partly in section of apparatus employed in producing the article of this invention, and Fig. 2 is a perspective view of the article produced in accordance with this invention.

In practicing this invention, a plurality of sheets 10 and 12 of fibrous material such as paper, cloth, woven fabric, or the like are assembled in stacked relation to form a compact integral unit as will be explained more fully hereinafter. In preparing the sheets for the unit, the sheets 10 are impregnated with a resinous binder such as a condensation resin of the phenolic, urea, thiourea or the like type, and the sheet 12 is at least coated with a similar resinous binder which is capable of transforming under heat and pressure into an infusible body which is substantially unaffected by heat and moisture.

In preparing the sheets, the coated sheet 12 is usually pretreated separately from the sheets 10. In order to provide a rough finish to the exposed surface of the sheet 12, after it is stacked with the sheets 10, a film of material 13 as illustrated in Fig. 2 that is suitable for cooperating with a cementitious material as will be explained more fully hereinafter is applied to the surface of the coated sheet 12 while the resin coating is still wet. As examples of some of the materials suitable for this purpose, granular or fibrous materials such as sand, sawdust, paper or mineral fibre, wood flour, powdered or granular plastic removed from scrap moldings, cotton linters, powdered cork or bark, and shredded cloth or the like may be so distributed over the surface of the sheet as to become partially embedded in the wet resinous coating.

In applying the granular or fibrous materials to the sheet 12, it is desirable to maintain a predetermined size of the particles. In practice, it is found that the granular or fibrous materials screened through a 20 to 30 mesh, or of a smaller size, are satisfactory for giving the desired rough surface. The granular or fibrous particles may be sifted directly onto the sheet 12 or otherwise distributed thereon becoming securely embedded in the wet resinous coating while giving a rough surface without detrimentally affecting the balance of the sheet. As normally sifted or distributed on the sheet it is impossible to overload it since the resinous coating on its surface functions to retain only a predetermined amount of the granular or fibrous particles per unit of area, the excess of the particles being easily dusted or blown off of the sheet since they are not embedded in the resin. The thickness of the film of the granular or fibrous materials carried in the resinous coating of the sheet 12 depends somewhat on the size of the particles deposited, the smaller particles giving a thinner film. As a general rule, it is found that a film of fibrous material of not over 1/64" on the surface of the sheet 12 is satisfactory for the purpose of this invention.

In order to retain the granular of fibrous particles in position on the sheet at least partially embedded in the resin, and also to prevent an excessive flow of the resin coating when the sheets 10 and 12 are consolidated, as will be explained more fully hereinafter, the sheets 12 coated with the resinous binder and carrying the film 13 of partially embedded granular or fibrous material, is subjected to sufficient heat for at least partially curing the resinous binder and for limiting the flow characteristics of the resin. In practice, a temperature of about 150° C. for a period of time of about ½ hour is satisfactory for this purpose, preventing the resinous binder from later flowing to completely cover the granular or fibrous material partially embedded therein when consolidated in the stack.

After the sheet 12 is treated in the manner hereinbefore described, it is stacked in assembled relation with the impregnated sheets 10 as shown in Fig. 1 of the drawing. A process for making two of the composite articles of this invention at the same time is illustrated in the drawing. As shown, two stacks of the plates 10 and 12 with the film 13 of fibrous or granular material thereon are disposed in a suitable mold in opposed relation with the films of the fibrous or granular material opposite each other. The mold may be of any standard construction, or as illustrated, comprise the molding plates 14 and platens 16 for receiving the stacked sheets of material to be treated. Since the sheets 12 carrying the films of fibrous or granular material are opposed, in order to prevent crushing of the portions of the fibrous or granular material which are not embedded in the partially cured resinous coating of the sheet 12, a cushion 18 is disposed between the surfaces of the two stacks, thereby separating the sheets 12. This cushion may be a pad of bare paper or cloth, or any similar fibrous material, that will function to relieve excessively high pressure on the peaks of the granular or fibrous materials carried by the sheets 12.

After the sheets 10 and 12 are stacked in assembled relation and disposed in the mold with the pad 18 adjacent the surface of the sheet 12 carrying the fibrous or granular material, the stack is subjected to sufficient heat and pressure to effect the curing of the resinous binder carried by the sheets 10 and where the sheet 12 has not been completely cured heretofore to complete the curing of the resinous coating of the sheet 12 and to consolidate the sheets into a composite integral unit. In practice, a temperature of about 175° C. for a period of time of 30 minutes for each 1/16" of thickness is satisfactory for this purpose where the impregnant is a phenolic condensation resin or a temperature of about 145° C. is satisfactory for the urea type resins.

Since the sheets 12 are pre-treated to at least partially cure the resin coating thereof, in consolidating the sheets 10 and 12 it is found that the resin coating of the sheet 12 does not flow sufficiently to cover the fibrous or granular material embedded therein or to penetrate therethrough sufficiently to bind with the cushion 18 employed in the molding operation. However, it is found that under the action of heat and pressure sufficient flow of the impregnant of the sheets 10 is obtained to securely bond with the partially cured resinous coating of the sheet 12 and produce a compact integral unit having a rough surface formed by the fibrous or granular particles as shown in Fig. 2.

The composite article produced in accordance with this invention is satisfactory either as the backing sheet or facing sheet for veneering operations requiring no further processing. Because of the rough surface formed by the fibrous or granular material on the sheet 12, it is apparent that any cementitious material suitable for bonding may be employed for cooperating therewith for veneering. The cementitious material may be either the rigid or flexible type of glue or cements of conventional types which will interlock with the fibrous or granular material carried on the surface of the molded article. Further, because the fibrous or granular material is unimpregnated, the weight added to the article is negligible with the result that a composite article is secured which is substantially balanced structure thereby minimizing warpage.

Although this invention has been described with reference to a particular embodiment thereof, it is, of course, not to be limited thereto except insofar as is necessitated by the prior art and the scope of the appended claims.

I claim as my invention:

1. The process of making a resinous product comprising the steps of, stacking sheets of fibrous material impregnated with a resinous binder in assembled laminated relation, disposing a sheet of fibrous material having a resinous binder associated therewith and an infusible material in the form of small discrete particles capable of cooperating with a cementitious material partially embedded in the resinous binder carried on the surface of the sheet, on the stacked sheets, the sheet carrying the material partially embedded in the resinous binder having been subjected to sufficient heat to at least partially cure the binder to limit the flow characteristics of the resinous binder, providing a fibrous pad over the surface of the sheet carrying the material partially embedded in the treated resinous binder, and applying heat and pressure to the assembled sheets to consolidate them into a compact integral unit, the fibrous pad cushioning the material partially embedded in the binder when the assembly is subjected to heat and pressure thereby preventing damage to the material and providing a surface capable of cooperating with a cementitious material that may be utilized in mounting the product.

2. The process of making a molded laminated body comprising the steps of, coating a sheet of fibrous material with a synthetic resin, distributing small discrete particles of infusible material over one of the resin coated surfaces of the sheet, treating the coated sheet carrying the particles by subjecting it to sufficient heat to at least partially cure the resin to limit the flow characteristics of the resin coating and to secure the particles as distributed over the surface, stacking the treated sheet carrying the particles as an outer sheet in assembled laminated relation with a plurality of sheets of fibrous material impregnated with a resin, and subjecting the stack to heat and pressure to mold them into a compact integral body, the particles carried by the outer sheet being protected during the molding by a removable pad in which they are cushioned to prevent their loss of identity thereby providing at least one rough surface on the molded body.

3. The process of making a molded laminated body comprising the steps of, stacking a plurality of sheets of fibrous material impregnated with a synthetic resin in assembled laminated relation, positioning a sheet of fibrous material coated with synthetic resin and carrying small discrete particles of infusible material distributed over one of its surfaces on the stack, the resin on the sheet carrying the particles having been subjected to sufficient heat to at least partially cure it and limit its flow characteristics, providing a pad over the particles, and applying heat and pressure to the assembled sheets to mold them into a compact integral body, the pad cushioning the particles on the surface of the body against the molding pressure thereby preventing their loss of identity and giving at least one rough surface to the molded body.

4. The process of making a resinous product comprising the steps of, at least coating a sheet of fibrous material with a synthetic resin, distributing small discrete particles of infusible material over one of the resin coated surfaces of the sheet to form a layer of not over $\frac{1}{26}$ inch thereon, subjecting the coated sheet carrying the layer of discrete particles to sufficient heat to at least partially cure the resin to limit its flow about the particles, stacking the sheet carrying the particles in the partially cured resin as an outer sheet in assembled laminated relation with a plurality of sheets of fibrous material impregnated with a resin, providing a fibrous pad over the layer of particles, and subjecting the stack to heat and pressure to consolidate the sheets into a compact integral body, the pad cushioning the particles on the surface of the outer sheet against the molding pressure thereby preventing their loss of identity and providing at least one rough surface on the molded body.

EUGENE R. PERRY.